United States Patent
Tamir et al.

(10) Patent No.: US 9,686,190 B2
(45) Date of Patent: Jun. 20, 2017

(54) TECHNIQUES FOR FORWARDING OR RECEIVING DATA SEGMENTS ASSOCIATED WITH A LARGE DATA PACKET

(71) Applicant: INTEL CORPORATION, Santa Clara, CA (US)

(72) Inventors: Eliezer Tamir, Bait Shemesh (IL); Ben-Zion Friedman, Jerusalem (IL)

(73) Assignee: INTEL CORPORATION, Santa Clara, CA (US)

( * ) Notice: Subject to any disclaimer, the term of this patent is extended or adjusted under 35 U.S.C. 154(b) by 704 days.

(21) Appl. No.: 13/839,393

(22) Filed: Mar. 15, 2013

(65) Prior Publication Data

US 2013/0259036 A1     Oct. 3, 2013

Related U.S. Application Data

(63) Continuation of application No. PCT/US2012/031285, filed on Mar. 29, 2012.

(51) Int. Cl.
*H04L 12/721*     (2013.01)
*H04L 12/805*     (2013.01)

(52) U.S. Cl.
CPC ............. *H04L 45/72* (2013.01); *H04L 47/36* (2013.01)

(58) Field of Classification Search
CPC .................................. H04L 47/36; H04L 45/72
See application file for complete search history.

(56) References Cited

U.S. PATENT DOCUMENTS

| | | | |
|---|---|---|---|
| 7,089,320 B1 | 8/2006 | Biederman et al. | |
| 7,471,700 B2 | 12/2008 | Moon et al. | |
| 2003/0110286 A1* | 6/2003 | Antal et al. | 709/236 |
| 2004/0105438 A1* | 6/2004 | Moon et al. | 370/389 |
| 2006/0193282 A1* | 8/2006 | Ikawa et al. | 370/328 |
| 2007/0025395 A1 | 2/2007 | Cardona et al. | |
| 2007/0223472 A1* | 9/2007 | Tachibana | H04L 47/36 370/389 |
| 2008/0244084 A1 | 10/2008 | Dietrich et al. | |
| 2009/0296738 A1* | 12/2009 | Shimada | H04L 47/10 370/474 |
| 2011/0222557 A1* | 9/2011 | Starks et al. | 370/465 |
| 2012/0314719 A1* | 12/2012 | Agiwal | H04W 28/02 370/474 |
| 2015/0188833 A1* | 7/2015 | Fusco | H04L 47/36 718/1 |

OTHER PUBLICATIONS

International Search Report and Written Opinion received for PCT Patent Application No. PCT/US2012/031285, mailed Oct. 30, 2012, 12 pages.

\* cited by examiner

*Primary Examiner* — Paul H Masur

(57) ABSTRACT

Examples are disclosed for forwarding or receiving data segments associated with a large data packets. In some examples, a large data packet may be segmented into a number of data segments having separate headers that include identifiers to associate the data segments with the large data packet. The data segments with separate headers may then be forwarded from a network node via a communication channel. In other examples, the data segments with separate headers may be received at another network node and then recombined to form the large data packet at the other network node. Other examples are described and claimed.

14 Claims, 11 Drawing Sheets

TECHNIQUES FOR FORWARDING OR RECEIVING DATA SEGMENTS ASSOCIATED WITH A LARGE DATA PACKET

RELATED CASE

This application is a Continuation of international patent application PCT/US2012/031285 titled "Techniques for Forwarding or Receiving Data Segments Associated with a Large Data Packet", filed on Mar. 29, 2012, the subject matter of which is incorporated herein by reference in its entirety.

BACKGROUND

Transmitting or receiving data in a communication network may involve a certain amount of processing overhead per data unit or data frames received or forwarded at a network node. Network nodes interconnected together via various types of communication channels are including capabilities to process increasingly larger blocks of data by elements of the operating system (OS) for these network nodes (e.g., the OS stack). Yet most network communication channels may establish a maximum transmission unit (MTU) for data frames that may include substantially smaller amounts of data than can be processed by network nodes having these increased capabilities.

DETAILED DESCRIPTION

Figure 1:
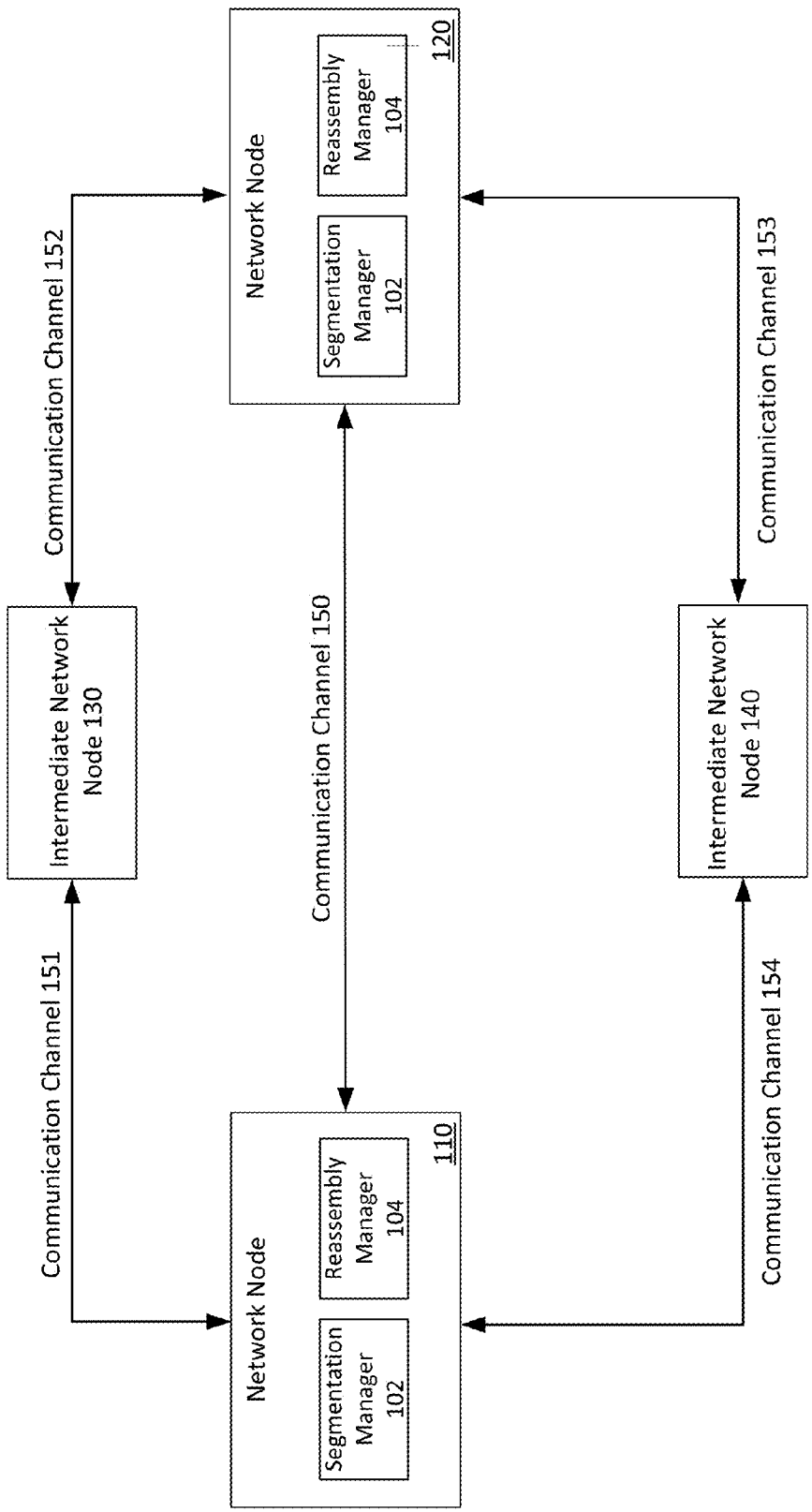
FIG. 1 illustrates an example network.

As contemplated in the present disclosure, network communication channels may establish an MTU for data frames that may include substantially smaller amounts of data than can be processed by network nodes having increased capabilities. For example, communication channels operating in compliance with industry standards such as the various Ethernet standards promulgated by the Institute of Electrical and Electronics Engineers (IEEE) may establish given MTUs that may be substantially smaller than elements at a network node can process. For example, one such Ethernet standard may include IEEE 802.3-2008, Carrier sense Multiple access with Collision Detection (CSMA/CD) Access Method and Physical Layer Specifications, Published in December 2008 (hereinafter "IEEE 802.3"). A communication channel arranged to operate in compliance with IEEE 802.3 may have an MTU of 1.5 kilobytes (kBs). Yet a network node may have computing resources (e.g., powerful central processing units (CPUs), large capacity memory channels, direct memory access schemes, etc.) to enable the network node's OS stack to be able to process a block or chunk of data much larger than 1.5 kBs. Hence, computing resources at the network nodes may be inefficiently utilized due to the extra overhead these resources may use when processing multiple small portions of data, rather than fewer large data portions.

In some examples, when processing data for transmission, network input/output (I/O) devices for network nodes may include offload resources to lessen the overhead load of these smaller portions on computing resources. One such solution may be Transmission Control Protocol (TCP) segmentation offload (TSO). However, TSO only works when TCP is being used. Also, TSO does not work well in congested networks because TSO may not deal well with lost packets.

According to some examples, large receive offload (LRO) schemes may be deployed to deal with computing processing bottlenecks at the receiver. However, LRO schemes are difficult to implement because received data frames may be interleaved with data frames received from a multitude of network connections. Also, LRO schemes, in light of the interleaved data frames, need to aggregate data frames. Aggregation of data frames adds latency. Further, network node resources used to implement LRO schemes may only be able to handle a limited number of concurrent active aggregations (total context size).

According to some examples, communication channels operating in accordance with IEEE 802.3 may transmit and receive jumbo data frames to reduce per-frame overhead. However, these jumbo data frames still bump up against MTUs that may go as high as 16 kBs. Also, IEEE 802.3 jumbo data frames are based on a per-link setting, their use may be difficult to negotiate, and jumbo data frames often impact network switch performance. Since jumbo data, frames may not be stopped in the middle to allow transmitting higher priority traffic, jumbo data frames may also impose a large latency on high priority network traffic. As a result of the above-mentioned limitations in TSO, LSO and jumbo data frames, employing a scheme to allow for larger blocks of data to be processed by computing resources such as an OS stack may be problematic when transmitting and receiving data frames at a network node that is subject to relatively small communication channel MTUs.

In some examples, techniques are implemented for forwarding or receiving data segments associated with a large data packet. According to some forwarding examples, a notification may be received that a large data, packet is ready to be forwarded from a network node to a destination. The large data packet may include an amount of data that is larger than a maximum transmission unit (MTU) associated with individual data frames to be forwarded from the network node via a communication channel. Also, the large data packet may be segmented into a plurality of data segments. In some examples, each data segment may include an amount of data that is no greater than the MTU. Separate headers may then be generated for each of the data segments. The separate headers may include a first identifier to indicate an association with the large data packet, a sequence number to indicate a respective sequence of each data segment, and a checksum. The data segments with separate headers may then be forwarded via the communication channel.

According to some receiving examples, a data segment at a network node may be received via a communication channel. The data segment may include a header having an identifier that indicates the data segment is one of a plurality of data segments associated with a large data packet destined for the network node. The header may also include a checksum and a sequence number to indicate a sequence of the data segment in relation to the plurality of data segments. Additional data segments may also be received at the network node. The additional data segments may separately have headers that include the identifier and also have headers that include checksums and sequence numbers to indicate a respective sequence of the additional data segments in relation to the plurality of data segments. In some examples, a data payload for the received data segment may be combined with data payloads for the received additional data segments. The combined data payloads may form at least a portion of the large data packet that has a data size larger than a maximum transmission unit (MTU) associated with individual data frames received via the communication channel.

FIG. 1 illustrates an example network 100. In some examples, FIG. 1 depicts network 100 including network nodes 110, 120 and intermediate network nodes 130, 140 interconnected via communication channels, 150-154, This disclosure is not limited to a network including two network nodes and two intermediate network nodes as shown in FIG. 1. Any number of network nodes, intermediate network nodes that may be interconnected by any number of communication channels may be contemplated by this disclosure. According to some examples, as shown in FIG. 1, network nodes 110, 120 separately include a segmentation manager 102 and a reassembly manager 104.

In some examples, elements of network 100 depicted in FIG. 1 may operate according to various communication protocol, standards or models. For example, elements of network 100 data frames may be forwarded or received via communication channels 150-154 in a protocol format associated with layer 2 (e.g., data link layer) protocol format. One such protocol format may be described in an Ethernet standard such as IEEE 802.3 or other IEEE standards (including progenies and variants) such as the IEEE 802.11-2008, Standard for Information technology—Telecommunications and information exchange between systems—Local and metropolitan area networks—Specific requirements, Part 11: Wireless LAN Medium Access Control (MAC) and Physical Layer (PHY) Specifications, published in June 2007 (hereinafter "IEEE 802.11"). This disclosure is not limited to only Ethernet standard protocol formats associated with layer 2 protocol formats.

In some examples, segmentation manager 102 may include logic and/or features to segment a large data packet prepared by computing resources (not shown in FIG. 1) at either network node 110 or 120. For these examples, the computing resources (e.g., OS stack elements) may have generated the large data packet based on protocols associated with higher layer protocol formats than layer 2 protocol formats, e.g., layer 3 and above protocols such network layer protocols, transport layer protocols, etc.). The large data packet, for example, may include an amount of data that may be larger than an MTU associated with individual data frames than can be forwarded via one or more communication channels 150-154. As described more below, in some examples, a transmit path for a large data packet may include logic and/or features of segmentation manager 102 segmenting the large data packet into a plurality of data segments that each include an amount of data that is not greater than the MTU. Segmentation manger 102 may also include logic and/or features to generate separate headers for the data segments and then forward the data segments with separate headers. For example, the data segments may be forwarded from network node 110 via one or more of communication channels 150, 151 or 154 or may be forwarded from network node 120 via one or more of communication channels 150, 152 or 153.

According to some examples, reassembly manager 104 may include logic and/or features to receive data segments associated with large data packets. As described more below, in some examples, a receive path for the data segments received at a network node may include logic and/or features of reassembly manager 104 combining data payloads for received data segments in order to reassemble large data packets. The reassembled large data packets may have a data size larger than an MTU associated with data frames that can be received over the communication link via which the network node received the data segments. For example, the data segments may be received from network node 110 via one or more of communication channels 150, 151 or 154 or may be received from network node 120 via one or more of communication channels 150, 152 or 153. Once the large data packet has been reassembled, reassembly manager 104 may indicate to OS stack elements associated with higher layer protocols that the large data packet has been received.

According to both the transmit path and receive path examples mentioned above, OS stack elements at network nodes 110 or 120 may be unaware that large data packets are being segmented and then reassembled. For example, the OS stack elements see the large data packet while network elements (e.g., communication channels 150-154 or intermediate network nodes 130, 140) see data segments that are compliant with MTU requirements. In some examples, separate headers may be generated by segmentation manager 102 for each data segment. The separate headers may associate the data segments with a given large data packet. The separate headers may enable reassembly manager 104 to combine the data segments to reassemble the large data packet yet provide an illusion to the OS stack elements that the large data packet was transmitted as a single unit. This illusion may be referred to as a "virtual jumbo data frame".

In some examples, intermediate nodes 130 or 140 may be deployed as network switches for network 100. For these examples intermediate nodes 130 or 140 may include logic and/or features to be able to read at least portions of separate headers for data segments. The logic and/or features may use information included in the separate headers to determine whether one or more data segments associated with a given large data packet have not been received or have been received with errors. An indication may then be provided by the switch back to the source of a missing data segment and/or the source of a data segment received with errors. The indication may inform the source that a data segment was missing or was received with errors. The logic and/or features at intermediate nodes 130 or 140 may also use the information in the separate headers to manage or arbitrate data traffic flow through these intermediate nodes.

Figure 2:
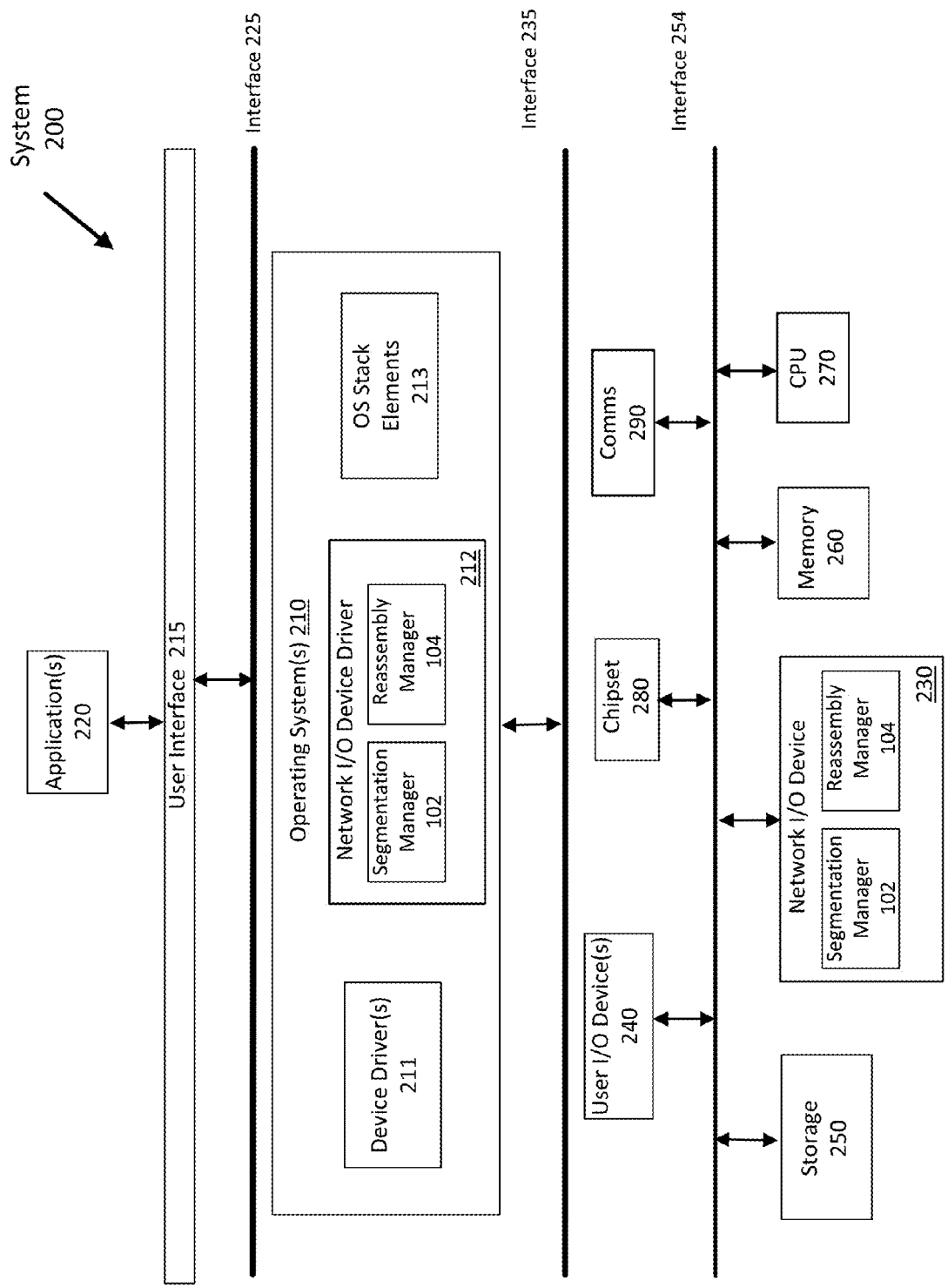
FIG. 2 illustrates an example system.

FIG. 2 illustrates an example system 200. According to some examples, system 200 may represent elements of a computing platform maintained at network node 110 or network node 120. As shown in FIG. 2, system 200 includes operating system(s) 210, application(s) 220, network input/output (I/O) device 230, user input/output (I/O) device 240, a storage 250, a memory 260, a central processing unit (CPU) 270, a chipset 280, and communications (comms) 290.

According to some examples, several interfaces are also depicted in FIG. 2 for interconnecting and/or communicatively coupling elements of system 200. For example, user interface 215 and interface 235 may allow for users (not shown) and/or application(s) 220 to interact with operating system(s) 210. Also, interface 235 may allow for elements of operating system(s) 210 (e.g., device driver(s) 211, network I/O driver 212, OS stack elements 213) to communicatively couple to elements of system 200 such as network I/O device 230, user I/O device(s) 240, storage 250, memory 260, CPU 270, chipset 280 or comms 290. Interface 254, for example, may allow hardware and/or firmware elements of system 200 to communicatively couple together, e.g., via a system bus or other type of internal communication channel.

In some examples, as shown in FIG. 2, system 100 may include operating system(s) 210. Operating system(s) 210, for example, may include one or more operating systems. Separate operating systems included in operating systems(s) 210 may be implemented as part of separate virtual machines supported by elements of system 200. For these examples, the separate virtual machines may be associated with one or more processors included in CPU 270.

According to some examples, as shown in FIG. 2, operating system(s) 210 may include device driver(s) 211, network I/O device driver 212 and operating system (OS) stack elements 213. Device driver(s) 211 may include logic and/or features configured to interact with hardware/firmware type elements of system 200 (e.g., via interface 235). For example, device driver(s) 211 may include device drivers to control or direct storage 250 or memory 260 to fulfill requests made by application(s) 220 or operating system(s) 210.

As shown in FIG. 2, operating system(s) 210 includes network 170 device driver 212. In some examples, network I/O device driver 212 may include logic and/or features to allow network I/O device 230 to interact with CPU 270, memory 260, chipset 280 or comms 290 in order to receive/forward data via communication channels coupled to system 200. As described more below, network I/O device driver 212 may include segmentation manager 102 and reassembly manager 104. According to some examples, segmentation manager 102 and reassembly manager 104 included in network I/O device driver 212 may enable a software implementation of segmenting and/or reassembly of large data packets.

As shown in FIG. 2, operating system(s) 210 includes OS stack elements 213. In some examples, OS stack elements 213 may include logic and/or features to process data received/forwarded from a network node that includes system 200. According to some examples, OS stack elements 213 may implement protocols associated with layer 3 and above protocols. As described more below, OS stack elements 213 may be configured to operate in cooperation with segmentation manger 102 and/or reassembly manager 104 to process large data packets received/forwarded at a network node that includes system 200.

In some examples, application(s) 220 may include applications that may be implemented on system 200. For these examples, applications(s) 220 may request access (e.g., through operating system(s) 210) or use of elements of system such as network I/O device 230, user I/O device(s) 240, storage 250, memory 260 or CPU 170.

According to some examples, network I/O device 230 may enable system 200 to couple to communication channels associated with a network (e.g., network 100). For example, network I/O device 230 may be arranged to function as a network interface card (NIC) for system 200. As shown in FIG. 2, network I/O device driver 212 may include segmentation manager 102 and reassembly manager 104. According to some examples, as described more below, segmentation manager 102 and reassembly manager 104 may be included in network I/O device 212 in order to enable a hardware implementation of segmenting and/or reassembling of large data packets.

In some examples, user I/O device(s) 240 may include one or more user input devices coupled to interface 254 for entering data and commands to be implemented by elements of system 200. Similarly, user I/O device(s) 240 may include one or more user output devices coupled to interface 254 for outputting information to an operator or user.

In some examples, storage 250 may include various types of memory configured to be implemented or operated in a storage mode of operation. Storage 250 may include at least one or a combination of different types of storage devices to store relatively large amounts of data. These different types of storage devices may include, but are not limited to, one or more of a magnetic disk drive, an optical disk drive, a tape drive, an internal storage device, an attached storage device, flash memory, battery backed-up SDRAM (synchronous DRAM), a network accessible storage device, and/or other types of non-volatile memory (e.g., phase change memory (PCM)).

According to some examples, memory 260 may include at least one or a combination of different types of memory to include random access memory (RAM), dynamic random access memory (DRAM), static RAM (SRAM), phase change material RAM (PRAM), and/or other types of volatile memory. In some examples, memory 260 may be configured to maintain transmit/receive buffers used to at least temporarily store large data packets before, after or during segmentation or reassembly.

According to some examples, CPU 270 may be implemented as a central processing unit for system 200. CPU 270 may include one or more processors separately having one or more processor cores. The processors included in CPU 270 may be any type of processor, such as, for example, a multi-core processor, a reduced instruction set computer (RISC), a processor having a pipeline, a complex instruction set computer (CISC), digital signal processor (DSP), and so forth.

In some examples, chipset 280 may provide intercommunication among operating system(s) 210, network user device 230, user I/O device(s) 240, storage 250, memory 260, CPU 270 or comms 290. For example, chipset 280 may provide intercommunication between operating system(s) 210, network I/O device 230, user I/O device(s) 240, storage 250 and CPU 270 to retrieve information from storage 250 to display graphics on a display included in user I/O device(s) 240. The graphics may have been rendered by CPU 270 at the request of an operating system included in operating system(s) 210.

In some examples, comms 290 may include logic and/or features to enable system 200 to communicate externally with elements remote to system 200. These logic and/or features may include communicating over wired, wireless or optical communication channels or connections via one or more wired, wireless or optical networks. In communicating across such networks, comms 290 may operate in accordance with one or more applicable communication or networking standards in any version (e.g., IEEE 802.3 or IEEE 802.11). Also, in some examples, comms 290 may be integrated with network I/O device 230 in order to receive/forward data via communication channels coupled to a network node that includes system 200.

As mentioned above, interface 254, may allow hardware and/or firmware elements of system 200 to communicatively couple together. According to some examples, interface 254 may operate in accordance with one or more protocols or standards. These protocols or standards may be described in one or one or more industry standards (including progenies and variants) such as those associated with the Inter-Integrated Circuit (I²C) specification, the System Management Bus (SMBus) specification, the Accelerated Graphics Port (AGP) specification, the Peripheral Component Interconnect Express (PCI Express) specification, the Universal Serial Bus (USB), specification, the High-Definition Multimedia Interface (HDMI) standard, the Digital Visual Interlace (DVI) specification, the Bluetooth™ specification, or the Serial Advanced Technology Attachment (SATA) specification. Although this disclosure is not limited to only the above-mentioned standards and associated protocols.

In some examples, as mentioned above, system 200 may represent elements of a computing platform maintained at network node 110 or network node 120. For these examples, network node 110 or network node 120 may include one or more computing devices. Example computing devices at network node 110 or network node 120 may include, but are not limited to, a server, a blade server, a computing board, a desktop computer, a personal computer (PC) or a laptop computer.

Figure 3:
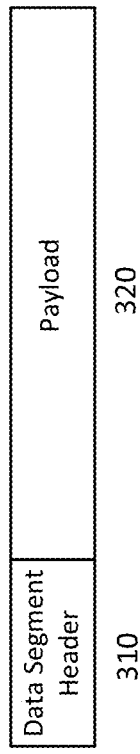
FIG. 3 illustrates an example data frame format.

FIG. 3 illustrates an example data segment format 300. As shown in FIG. 3, data, segment format 300 includes fields 310 and 320, having a data segment header and a payload, respectively. In some examples, data segment format 300 may represent a data segment format for transmitting segmented portions of a large data packet.

In some examples, the data segment header included in field 320 may include information to associate a data segment, with a given large data packet. Also, the payload included in field 330 may include a segmented portion of the given large data packet. For these examples, the amount of total data included in a data frame having the format of data frame format 300 may be no greater than the MTU for the communication channel via which the data, frame will be received or forwarded.

According to some examples, although not shown, a communication channel header may also be added to a data segment in the format of data segment format 300. For these examples, the communication channel header may include protocol-specific information used to transmit data frames via a communication channel. For example, if the communication channel were operated in accordance with an Ethernet standard the information included in this additional header would be an Ethernet data frame header. As a result of having the Ethernet data frame header, data frames in the format of data frame format 300 may be in a protocol format associated with layer 2 protocols (e.g., data link layer protocols). This disclosure also contemplates other types of protocol-specific information besides Ethernet that may be associated with layer 2 protocols.

Figure 4:
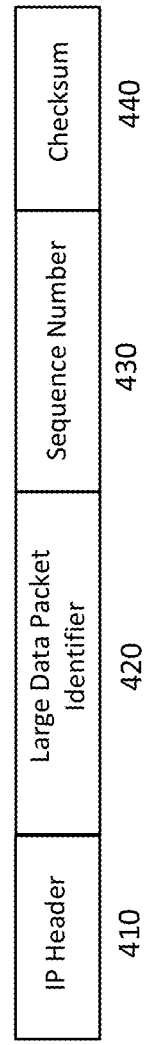
FIG. 4 illustrates an example data segment header format.

FIG. 4 illustrates an example data segment header format 400. As shown in FIG. 4, data segment header format 400 includes fields 410, 420, 430 and 440 having an Internet Protocol (IP) header, a large data, packet identifier, a sequence number, and a checksum, respectively. In some examples, data segment header format 400 may represent the information include in field 310 of a data segment in the format of data segment format 300 mentioned above for FIG. 3. This disclosure is not limited the arrangement of the fields 410, 420, 430 and 440 as shown in FIG. 4. Fields 410, 420, 430 and 440 may be arranged in any combination in relation to each other and some fields may even be removed.

According to some examples, IP header information included in field 410 may include information to enable certain elements of a network node to handle a data segment. For example, a receive or transmit path for a data segment having a header in the format of data segment, header format 400 may be associated with a software implementation having segmentation manager 102 and/or reassembly manager 104 at network I/O device driver 212 as mentioned above for FIG. 2. The IP header information included in field 410 may enable network I/O device driver 230 to route the data segment to/from network I/O device driver 212.

In alternative examples, a receive or transmit path for a data segment having a header in the format of data segment header format 400 may be associated with a hardware implementation having segmentation manager 102 and reassembly manager 104 at network I/O device 230. For these alternative examples, field 410 may be removed since segmentation and reassembly occurs by elements located at network I/O device 230 rather than by elements located at network I/O device driver 212.

In some examples, large data packet identifier information included in field 420 may include identifier information to associate a data segment with a given large data packet. For example, large data packets may be assigned identifiers either by OS stack elements 213 or by logic and/or features at segmentation manager 102. According to some examples, the assigned identifiers may include information to indicate the source of the large data packet and/or may include randomly generated numbers that may uniquely identify a given large data packet.

According to some examples, sequence number information included in field 430 may include information to indicate what segmented portion of a given large data packet is included in a data segment having a data segment header in the format of data segment header format 400. For example, the sequence number information included in field 430 may indicate that the data segment is segment "N" (where "N" represents any positive whole integer) of "n" total segments (where "n" represents any positive whole integer equal to or greater than "N"). So if sequence number information included in field 430 indicates N/n, the data segment is the $N^{th}$ segment of n total segments.

In some alternative examples, large packet identifier information in field 420 may include an indication of the total segments and sequence number information in field 430 may include countdown information starting at "N". For these alternative examples, a first data segment in the sequence would have a first sequence number equal to "N". Subsequent data segments would countdown from that first sequence number until the last data segment has a sequence number equal to 1.

According to some examples, checksum information included in field 440 may include information to verify the integrity or identify possible errors associated with data segments received at a network node. Field 440 may be included at the end of a data, segment header in the format of data segment header format 400 as shown in FIG. 4. Field 440 may also be located in other parts of a data segment header to include but not limited to the front of the data segment header. For these examples, the checksum information included in field 440 may also be used to allow for recovery of a data segment independent from other data segments associated with the large data packet.

Figure 5:
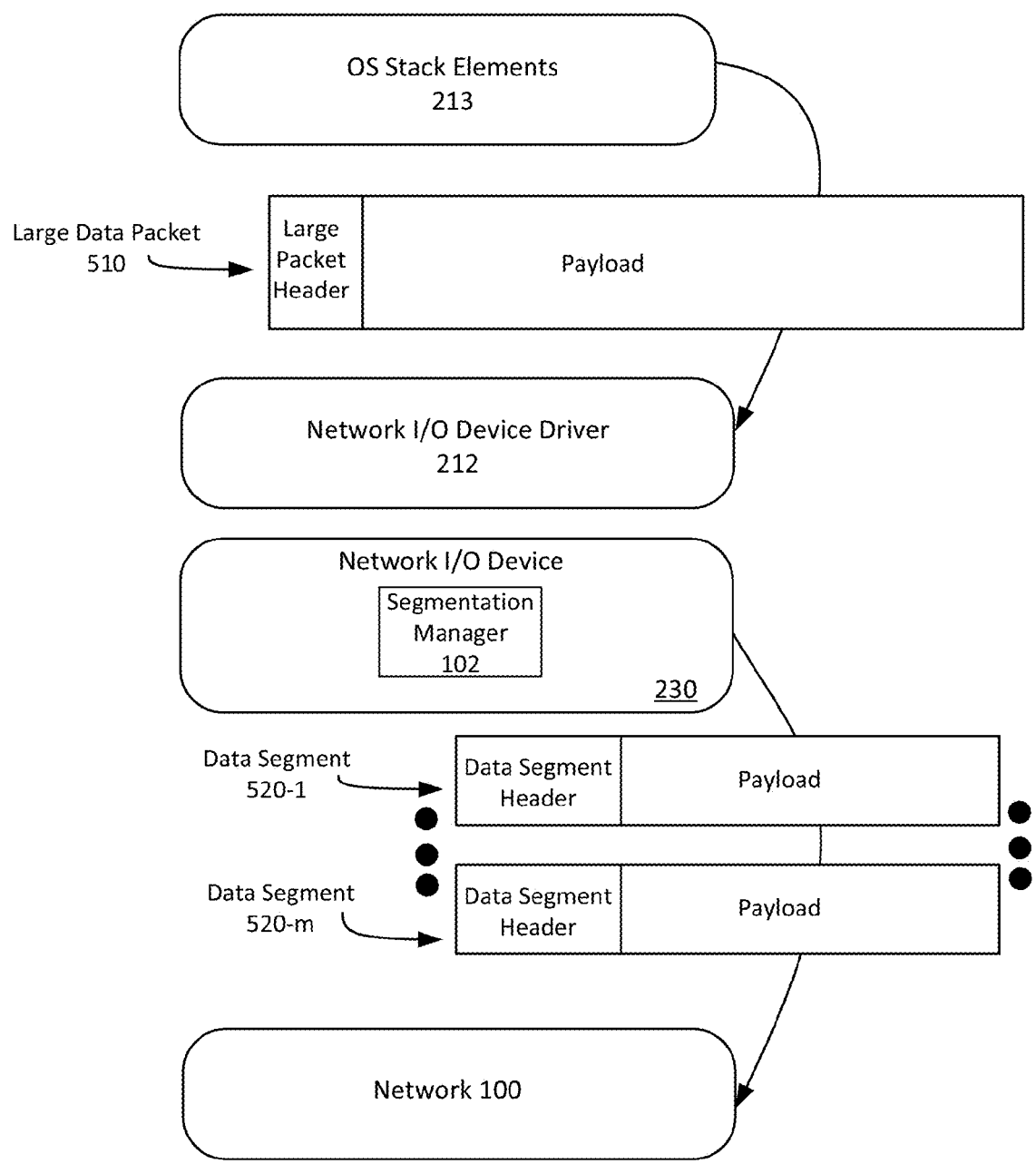
FIG. 5 illustrates a first example transmit path.

FIG. 5 illustrates a first example transmit path 500. As shown in FIG. 5, transmit path 500 indicates the transmit path a large data packet 510 may follow as large data packet 510 is segmented and then forwarded to network 100. In some examples, as shown in FIG. 5, elements of system 200 as described in FIG. 2 are used to illustrate transmit path 500. Also, according to these examples, transmit path 500 depicted in FIG. 5 shows a segmentation manager 102 at network I/O device 230 to indicate a hardware implementation of segmenting large data packet 510. For these examples, OS stack elements 213 may initially generate large data packet 510. As shown in FIG. 5, large data packet 510 includes a large packet header and a payload. The large packet header, for example, may include information to indicate the destination of the data included in the payload of large data packet 510. According to some examples, large data packet 510 may be at least temporarily stored in a memory (e.g., memory 260) for system 200.

In some examples, as shown in FIG. 5, OS stack element 213 may indicate to or notify network I/O device driver 212 that large data packet 510 is ready to be forwarded or transmitted to a destination (e.g., network nodes 110 or 120). The notification may include information to indicate one or more memory addresses associated with the memory where large data packet 510 may be at least temporarily stored. For these examples, network I/O device driver 212 may relay that notification to network I/O device 230. Based on the notification, a segmentation manager 102 at network I/O device 230 may include logic and/or features to segment large data packet 510 into a plurality of data segments. Segmentation of large data packet 510 may include accessing the memory associated with the memory addresses included in the notification to obtain portions of the large data packet to be included in the data segments.

According to some examples, as shown in FIG. 5, data segments 520-1 to 520-m (where "m" is any positive integer greater than 1), in the format of data segment format 300 may be the result of the segmentation of large data packet 510. For these examples, data segment headers included in each of the data frames 520-1 to 520-m may be in the format of data segment header format 400. The data segment headers may include information to at least associate data segments 520-1 to 520-m with large data packet 510 and also to indicate respective sequence information. Also included in data segments 520-1 to 520-m is a payload that holds or contains the segmented portions of large data packet 510.

According to some examples, network 100 may operate in compliance with one or more of the Ethernet standards such as IEEE 802.3 or IEEE 802.11. For these examples, the MTU for communication channels of network 100 may be 1.5 kBs and the payload of large data packet 510 may include an amount of data much larger than 1.5 kBs (e.g., ≥64 kBs). Also, for these examples, a communication channel header may be added to data segments 520-1 to 520-m. The communication channel header may be an Ethernet header to enable these data segments to be forwarded via the communication channels of network 100 that operate in compliance with IEEE 802.3.

Figure 6:
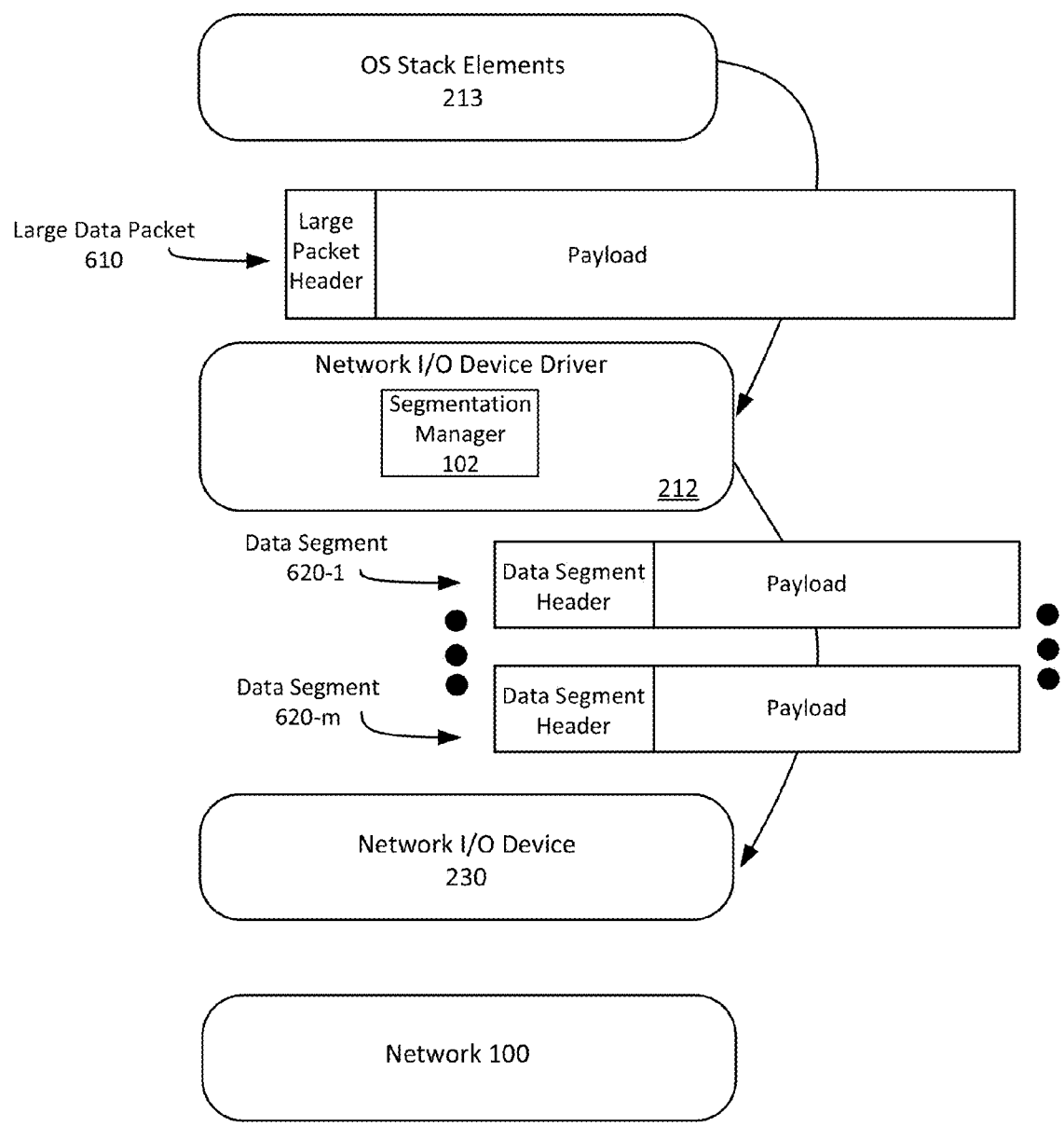
FIG. 6 illustrates a second example transmit path.

FIG. 6 illustrates a second example transmit path 600. According to some examples, transmit path 600 is similar to transmit path 500 shown in FIG. 5 with the exception that segmentation manager 102 is located with network I/O device driver 212. For these examples, transmit path 600 indicates a software implementation of segmenting a large data packet 610.

In some examples, as shown in FIG. 6, OS stack element 213 may indicate to or notify network I/O device driver 212 that large data packet 610 is ready to be forwarded or transmitted to a destination. The notification may include information to indicate a memory address associated with the memory where large data packet 610 may be at least temporarily stored. For these examples, segmentation manager 102 at network I/O device driver 212 may include logic and/or features to segment large data packet 610 into a plurality of data segments. Segmentation of large data packet 610 may include accessing the memory associated with the one or more memory addresses included in the notification to obtain portions of the large data packet to be included in the data segments.

According to some examples, as shown in FIG. 6, data segments 620-1 to 620-m, in the format of data segment format 300 may be the result of the segmentation of large data packet 610. For these examples, data segment headers included in each of the data segments 620-1 to 620-m may be in the format of data segment header format 400. The data segment headers may include information to at least associate data segments 620-1 to 620-m with large data packet 610 and also to indicate respective sequence information.

Figure 7:
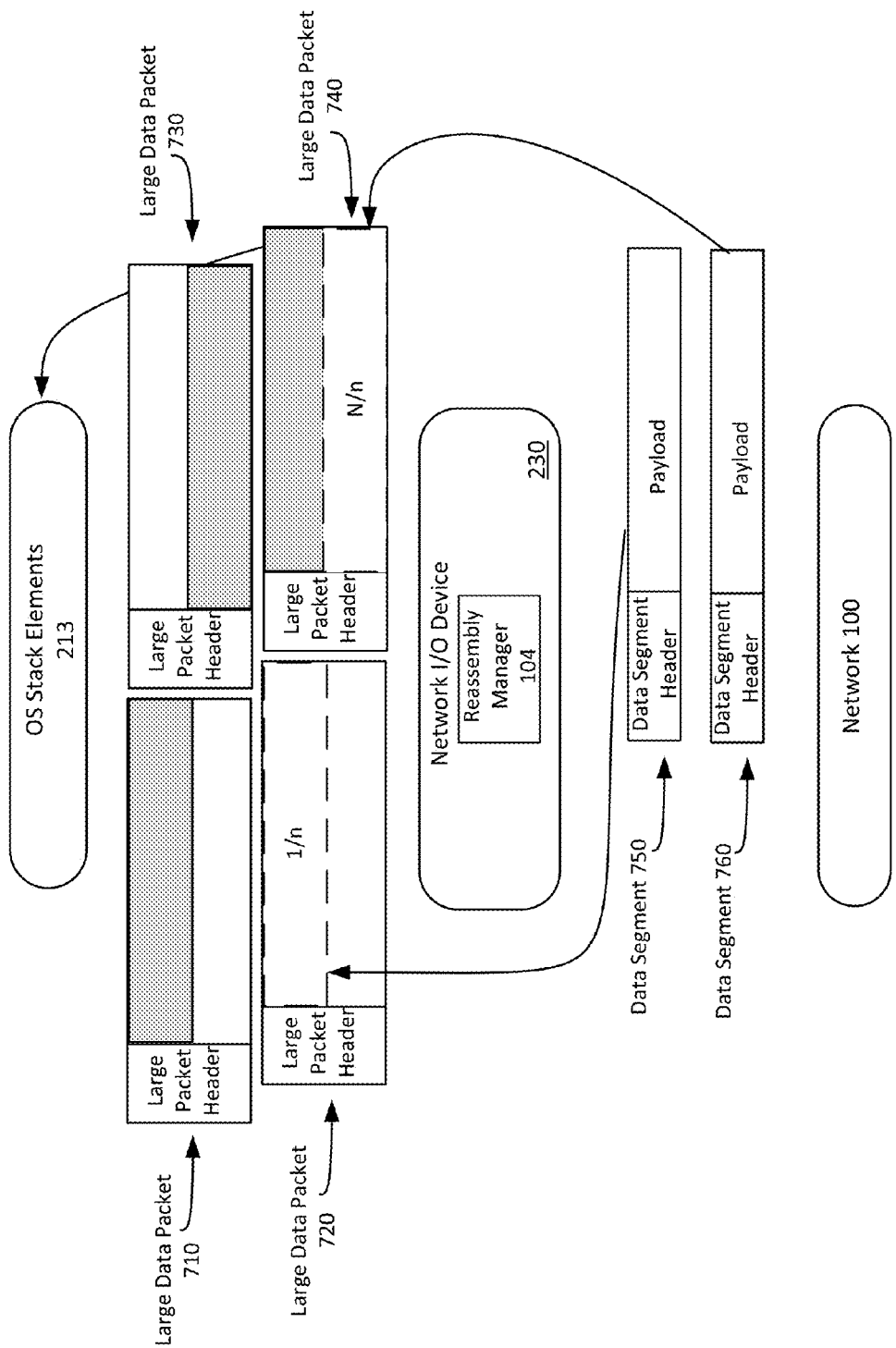
FIG. 7 illustrates a first example receive path.

FIG. 7 illustrates a first example receive path 700. As shown in FIG. 7, receive path 700 indicates a receive path for data segments having payloads that may be recombined to form large data packets. In some examples, as shown in FIG. 7, elements of system 200 as described in FIG. 2 are used to illustrate receive path 700. Also, according to these examples, receive path 700 depicted in FIG. 7 shows a reassembly manager 104 at network I/O device 230 to indicate a hardware implementation of combining payloads of data segments to reassemble large data packets. The separate large packet headers for large data packets 710, 720, 730 and 740, for example, may include information to indicate the source of the data included in the payloads of these large data packets and other information to be used by OS stack elements 213 to process the large data packets. According to some examples, the large data packets may be at least temporarily stored in a memory (e.g., memory 260) for system 200.

According to some examples, as shown in FIG. 7, reassembly manager 104 at network I/O device 230 may include logic and/or features to receive data segments 750 and 760 from network 100. For these examples, data segments 750 and 760 may be in the format of data segment format 300 and the data segment headers included in each of these data segments may be in the format of data segment header format 400. Reassembly manager 104 may also include logic and/or features to obtain information from the data, segment headers include in data segments 750 and 760. This obtained information may enable reassembly manager 104 to determine which large data packet(s) from among large data packets 710, 720, 730 or 740 that data segments 750 or 760 may be associated with. The information obtained may also be used to determine each data segment's respective sequence related to other data segments associated with the same large data packet.

In some examples, as shown in FIG. 7, reassembly manager 104 may determine that data segment 750 is associated with large data, packet 720 and data segment 760 is associated with large data packet 704. For these examples, sequence information included in the segmented packet, header for data frame 750 may indicate this data segment is the first (l/n) of a plurality of data segments associated with large data packet 720. Reassembly manager 104 may then place at least the payload of data segment 750 in a memory having one or more memory addresses associated with or allocated for large data packet 720. The payload of data segment 750 may be placed in the memory based on the obtained sequence information. Also, sequence information included in the data segment header included in data segment 760 may indicate the associated data segment is the last (N/n) of a plurality of data segments for large data packet 740. Reassembly manager 104 may then place at least the payload of data frame 760 in the one or more memory address associated with or allocated for large data packet 740. The payload of data segment 750 may also be placed in the memory based on the obtained sequence information.

According to some examples, since the data segment, included in data segment 760 may be the last (N/n) of a plurality of data segments associated with large data packet 740, reassembly manager 104 may include logic and/or features to cause a notification to be relayed to OS stack elements 213. For these examples, the notification may indicate to OS stack element 213 that large data packet 740 has been received. The notification, for example, may include a memory address associated with where the combined data payloads for large data packet 740 were stored in the memory for system 200.

In some examples, payload information included in a data frame may include the large packet header information. For example, the first data segment in a sequence (e.g., 1/n) may be reserved to hold the large packet header information in its payload. In other examples, the last data segment in a sequence (e.g., N/n) may be reserved to hold the large packet header information in its payload.

Figure 8:
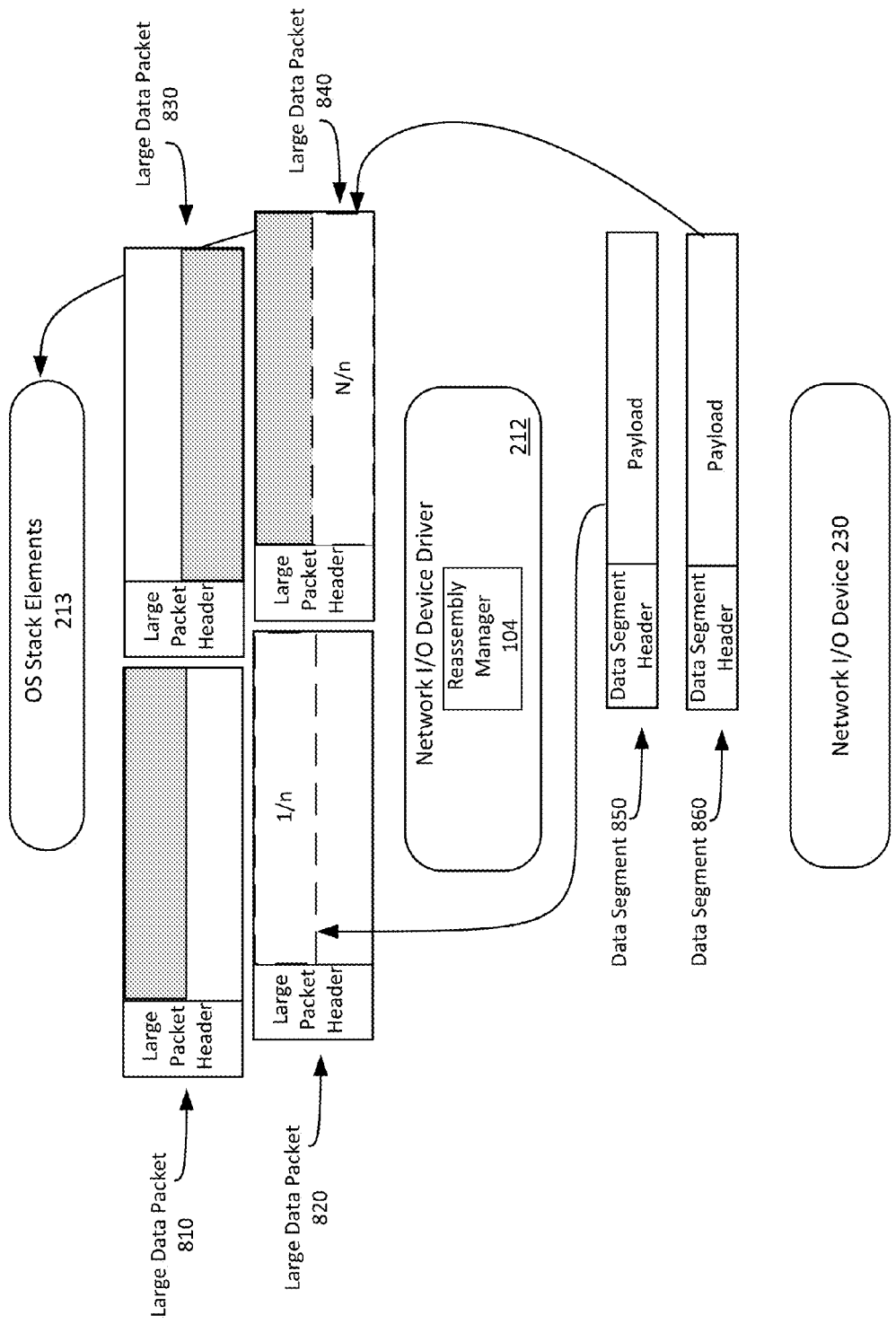
FIG. 8 illustrates a second example receive path.

FIG. 8 illustrates a second example receive path 800. According to some examples, receive path 800 is similar to receive path 700 shown in FIG. 7 with the exception that reassembly manager 104 is located with network I/O device driver 212. For these examples, receive path 800 indicates a software implementation of combining data segments associated with large data packets.

In some examples, network I/O device 230 may receive data segments 850 and 860 from network 100. Once received by network I/O device 230, reassembly manager 104 at network I/O device driver 212 may include logic and/or features to combine the payload included in data segment 850 with large data packet 820 in a similar manner as described above for FIG. 7. Reassembly manager 104 at network I/O device driver 212 may also combine the payload included in data segment 860 with large data packet 840 and notify OS stack element 213 in a similar manner as described above for FIG. 7.

Figure 9:
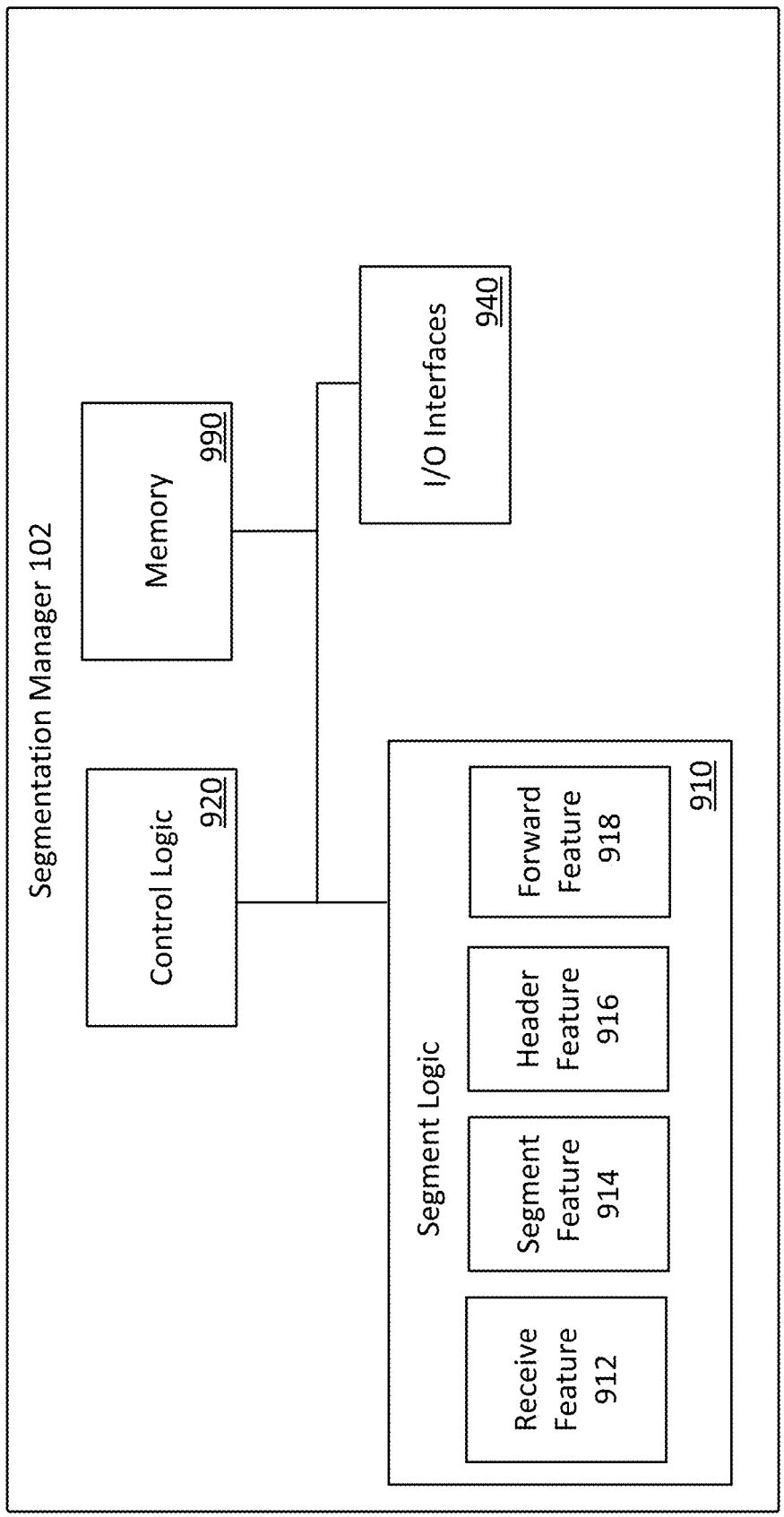
FIG. 9 illustrates a block diagram of an example segmentation manager

FIG. 9 illustrates a block diagram of an example architecture for a segmentation manager 102. In some examples, segmentation manager 102 includes features and/or logic configured or arranged for segmenting large data packets to be forwarded towards a destination from a network node coupled to a communication channel of a network. According to some examples, as shown in FIG. 9, segmentation manager 102 includes a segment logic 910, a control logic 920, a memory 930 and input/output (I/O) interfaces 940. As illustrated in FIG. 9, segment logic 910 may be coupled to control logic 920, memory 930 and I/O interfaces 940. Segment logic 910 may include one or more of a receive feature 912, a segment feature 914, a header feature 916 or a forward feature 918, or any reasonable combination thereof.

In some examples, the elements portrayed in FIG. 9 are configured to support or enable segmentation manager 102 as described in this disclosure. A given segmentation manager 102 may include some, all or more elements than those depicted in FIG. 9. For example, segment logic 910 and control logic 920 may separately or collectively represent a wide variety of logic device(s) or executable content to implement the features of segmentation manager 102. Example logic devices may include one or more of a microprocessor, a microcontroller, a processor circuit, a field programmable gate array (FPGA), an application specific integrated circuit (ASIC), a sequestered thread or a core of a multi-core/multi-threaded microprocessor, or a combination thereof.

In some examples, as shown in FIG. 9, receive feature 912, segment feature 914, header feature 916 or forward feature 918. In some examples, these features may separately or collectively represent logic, instructions or executable content. Segment logic 910 may be configured to use one or more of these features to perform operations. For example, receive feature 912 may receive a notification from OS stack elements that a large data packet is ready to be forwarded from a network node. Segment feature 914 may segment the large data packet into a plurality of data segments. Header feature 916 may generate headers for the plurality of data segments. Forward feature 918 may then forward the data segments via a communication channel coupled to the network node. Also, receive feature 912 may receive indications that data segments were either not received or were received with errors.

In some examples, control logic 920 may be configured to control the overall operation of segmentation manager 102. As mentioned above, control logic 920 may represent any of a wide variety of logic device(s) or executable content. For some examples, control logic 920 may be configured to operate in conjunction with executable content or instructions to implement the control of segmentation manager 102. In some alternate examples, the features and functionality of control logic 920 may be implemented within segment logic 910.

According to some examples, memory 930 may be arranged to store executable content or instructions for use by control logic 920 and/or segment logic 910. The executable content or instructions may be used to implement or activate features, elements or logic of segmentation manager 102. Memory 930 may also be arranged to at least temporarily maintain information associated with segmenting large data packets into a plurality of data segments.

Memory 930 may include a wide variety of non-volatile memory media including, but not limited to, one or more types of flash memory, programmable variables or states, ROM, RAM, or other static or dynamic storage media.

In some examples, I/O interfaces 940 may provide an interface via a local communication medium or link between segmentation manager 102 and elements of system such as system 200. I/O interfaces 940 may include interfaces that operate according to various communication protocols or standards to communicate over the local communication medium or link. These communication protocols or standards may be described in one or more industry standards (including progenies and variants) such as those associated with the $I^2C$ specification, the SMBus specification, the PCI Express specification or the USB, specification. This disclosure is not limited to only the above-mentioned standards and associated protocols.

According to some examples, I/O interfaces 940 may provide an interface via a network communication medium link or channel between segmentation manager 102 and elements located remote with respect to a network node including segmentation manager 102. I/O interfaces 940 may include interfaces that operate according to various communication protocols or standards to communicate over the network communication medium link or channel. These communication protocols or standards may be described in standards or specifications (including progenies and variants) such as the Ethernet standard. This disclosure is not limited to only the Ethernet standard and its associated protocols.

Figure 10:
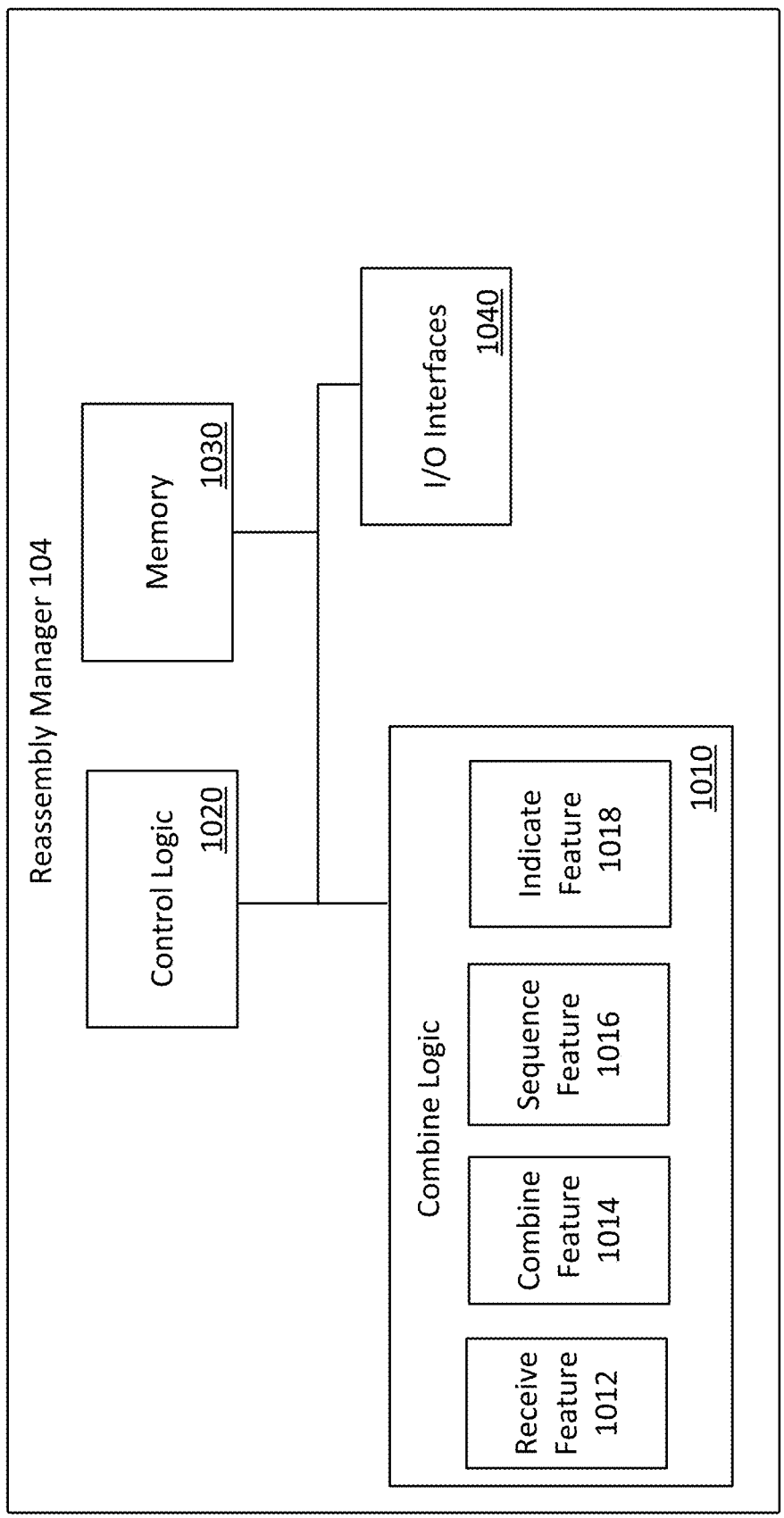
FIG. 10 illustrates a block diagram of an example reassembly manager.

FIG. 10 illustrates a block diagram of an example architecture for reassembly manager 104. In some examples, reassembly manager 104 includes features and/or logic configured or arranged for reassembling data segments associated with one or more large data packets. According to some examples, as shown in FIG. 10, reassembly manager 104 includes a combine logic 1010, a control logic 1020, a memory 1030 and input/output (I/O) interfaces 1040. As illustrated in FIG. 10, combine logic 1010 may be coupled to control logic 1020, memory 1030 and I/O interfaces 1040. Combine logic 1010 may include one or more of a receive feature 1012, a combine feature 1014, a sequence feature 1016 or an indicate feature 1018, or any reasonable combination thereof.

In some examples, the elements portrayed in FIG. 10 are configured to support or enable reassembly manager 104 as described in this disclosure. A given reassembly manager 104 may include some, all or more elements than those depicted in FIG. 10. For example, combine logic 1010 and control logic 1020 may separately or collectively represent a wide variety of logic device(s) or executable content to implement the features of reassembly manager 104. Example logic devices may include one or more of a microprocessor, a microcontroller, a processor circuit, an FPGA, an ASIC, a sequestered thread or a core of a multi-core/multi-threaded microprocessor, or a combination thereof.

In some examples, as shown in FIG. 10, receive feature 1012, combine feature 1014, sequence feature 1016 or indicate feature 1018. In some examples, these features may separately or collectively represent logic, instructions or executable content. Combine logic 1010 may be configured to use one or more of these features to perform operations. For example, receive feature 1012 may receive data segments associated with a segmented large data packet via a communication channel coupled to a network node. Combine feature 1014 may obtain information included in data segment headers for the data segments. Combine feature 1014 may then combine payloads of the data segments based on the obtained information in order to reassemble at least portions of the large data packet. Sequence feature 1016 may determine whether one or more data segments associated with the large data packet are missing. Indicate feature 1018 may indicate to OS stack elements that the large data packet has been received. Indicate feature 1018 may alternatively indicate to the source of the data segments that one or more of data segments associated with the large data packet have not been received or where received with errors.

In some examples, control logic 1020 may be configured to control the overall operation of reassembly manager 104. As mentioned above, control logic 1020 may represent any of a wide variety of logic device(s) or executable content. For some examples, control logic 1020 may be configured to operate in conjunction with executable content or instructions to implement the control of reassembly manager 104. In some alternate examples, the features and functionality of control logic 1020 may be implemented within combine logic 1010.

According to some examples, memory 1030 may be arranged to store executable content or instructions for use by control logic 1020 and/or combine logic 1010. The executable content or instructions may be used to implement or activate features, elements or logic of reassembly manager 104. As described more below, memory 1030 may also be arranged to at least temporarily maintain information associated with combining or reassembling data segments associated with one or more large data packets.

Memory 1030 may include a wide variety of non-volatile memory media including, but not limited to, one or more types of flash memory, programmable variables or states, ROM, RAM, or other static or dynamic storage media.

In some examples, I/O interfaces 1040 may provide an interface via a local communication medium or link between reassembly manager 104 and elements of system such as system 200. I/O interfaces 1040 may include interfaces that operate according to various communication protocols or standards to communicate over the local communication medium or link. These communication protocols or standards may be described in one or more industry standards (including progenies and variants) such as those associated with the I²C specification, the SMBus specification, the PCI Express specification or the USB, specification. This disclosure is not limited to only the above-mentioned standards and associated protocols.

According to some examples, I/O interfaces 1040 may provide an interface via a network communication medium link or channel between reassembly manager 104 and elements located remote with respect to a network node including reassembly manager 104. I/O interfaces 1040 may include interfaces that operate according to various communication protocols or standards to communicate over the network communication medium link or channel. These communication protocols or standards may be described in standards or specifications (including progenies and variants) such as the Ethernet standard. This disclosure is not limited to only the Ethernet standard and its associated protocols.

Figure 11:
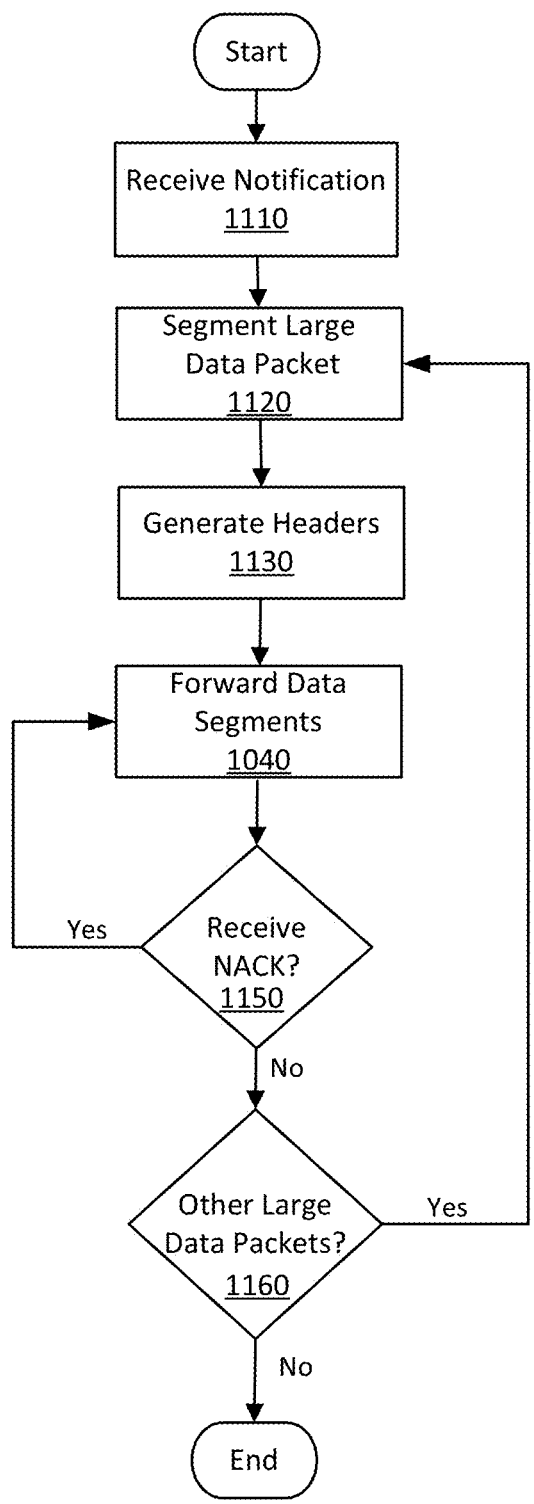
FIG. 11 illustrates an example flow diagram for forwarding data segments associated with a large data packet.

FIG. 11 illustrates an example flow diagram for forwarding data segments associated with a large data packet. In some examples, elements of network 100 as shown in FIG. 1, elements of system 200 as shown in FIGS. 2 and 5-8 and formats 300/400 as shown in FIGS. 3-4 may be used to illustrate example operations related to the flow chart depicted in FIG. 11. Segmentation manager 102 as shown in FIG. 9 may also be used to illustrate the example operations. The described example operations are not limited to implementations on network 100, elements of system 200 or formats 300/400 described for FIGS. 2-8 or to segmentation manager 102 described for FIG. 9.

Moving from the start to block 1110 (Receive Notification), a segmentation manager 102 at network node 110 may include logic and/or features configured to receive a notification (e.g., via receive feature 912) that a large data packet is ready to be forwarded from network node 110 to network node 120. In some examples, the large data packet may include an amount of data that is larger than an MTU associated with network 100 and/or one or more the communication channels coupled to network node 110 or network node 120. For these examples, the notification may have been received directly from OS stack elements 213 (see transmit path 600) or relayed through I/O device drive 212 (see transmit path 500).

Proceeding from block 1110 to block 1120 (Segment Large Data Packet), segmentation manager 102 may include logic and/or features configured to segment the large data packet into a plurality of data segments (e.g., via segment feature 914), each data segment including an amount of data that is no greater than the MTU.

Proceeding from block 1120 to block 1130 (Generate Headers), segmentation manager 102 may include logic and/or features configured to generate headers for the data segments (e.g., via header feature 916). In some examples, segmentation manager 102 may generate separate headers for the data segments in the format of data segment header format 400. For these examples, the separate headers may each include an identifier to indicate an association with the large data packet and a sequence number to indicate a respective sequence of each data segment. The separate headers may also include a checksum. The separate headers may also include an IP header, but an IP header may not always be necessary as mentioned previously.

Proceeding from block 1130 to block 1140 (Forward Data Segments), segmentation manager 102 may include logic and/or features configured to forward the data segments with separate headers via at least one of the communication channels coupled to network node 110 (e.g., via forward feature 918). In some examples, the separate headers may be forwarded in data segment format 300. For these examples, data segments in the format of data segment format 300 may also include communication channel headers. The communication channel headers may enable the data segments to be forwarded in a protocol format associated with a layer 2 protocols (e.g., Ethernet).

Proceeding from block 1140 to decision block 1150 (Receive NACK?), segmentation manager 102 may include logic and/or features configured to determine whether a negative acknowledgement (NACK) has been received (e.g., via forward feature 912) following the forwarding of one or more of the data segments. In some examples, the NACK may be an indication received from either an intermediate node (e.g., intermediate nodes 130 or 140) or network node 120 that one or more of the data segments were not received or were received with errors. For these examples, the checksum and/or sequence information included in the data segment headers may be used to determine whether data segments were either not received or where received with errors. According to some examples, if a NACK was received, the process moves to block 1040 and the one or more data segments associated with the NACK may be re-forwarded. Otherwise, the process moves to decision block 1160.

Moving from decision block 1150 to decision block 1160 (Other large Data Packets?), segmentation manager 102 may determine whether additional large data packets need to be segmented. In some examples, if more large data packets are to be segmented the process moves to block 1120. Otherwise, the process comes to an end.

Figure 12:
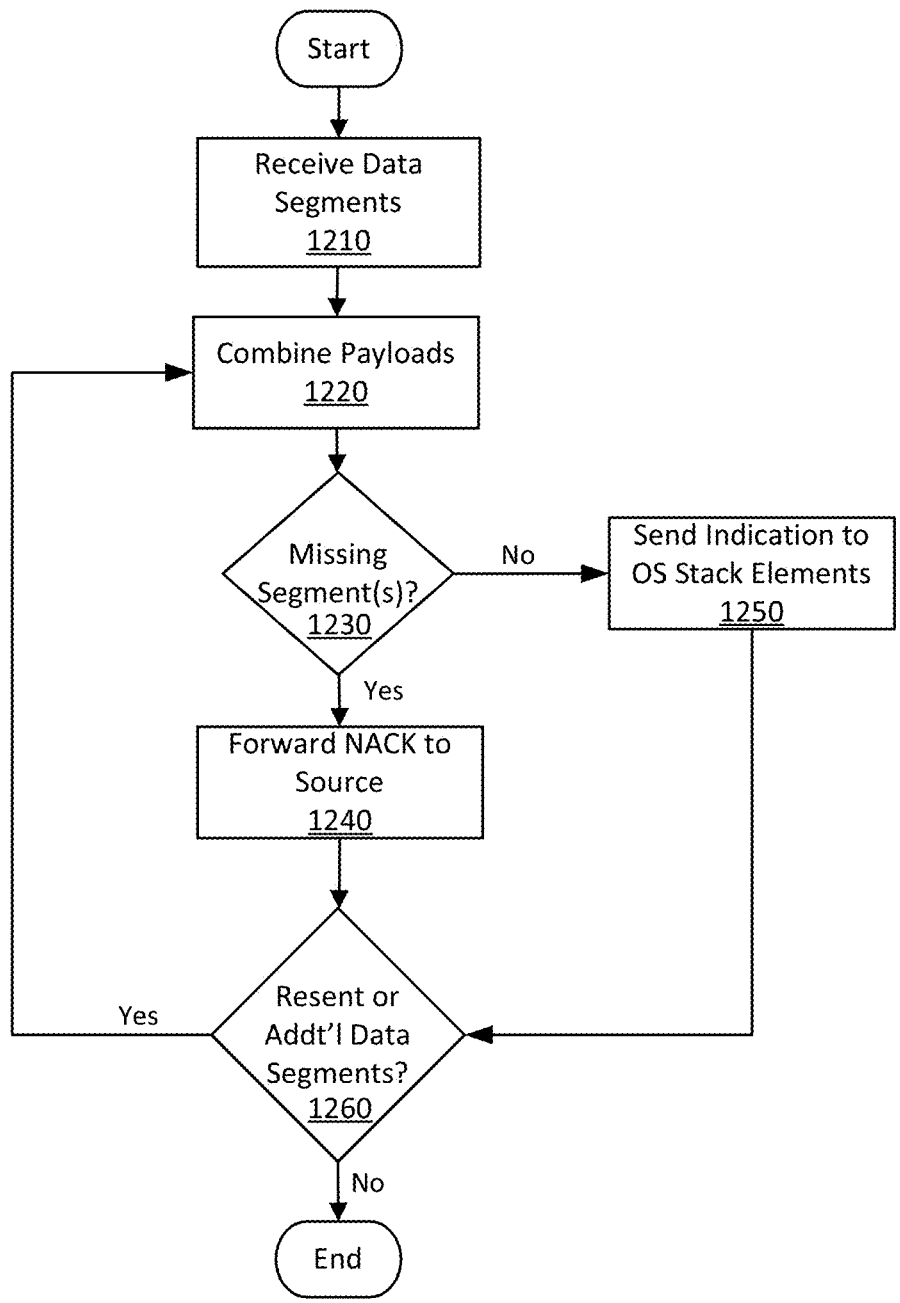
FIG. 12 illustrates an example flow diagram for receiving data segments associated with a large data packet.

FIG. 12 illustrates an example flow diagram for receiving data segments associated with a large data packet. In some examples, elements of network 100 as shown in FIG. 1, elements of system 200 as shown in FIGS. 2 and 5-8 and formats 300/400 as shown in FIGS. 3-4 may be used to illustrate example operations related to the flow chart depicted in FIG. 12. Reassembly manager 104 as shown in FIG. 10 may also be used to illustrate the example operations. The described example operations are not limited to implementations on network 100, elements of system 200 or formats 300/400 described for FIGS. 2-8 or to reassembly manager 104 described for FIG. 10.

Moving from the start to block 1210 (Receive Data Segments), reassembly manager 104 may include logic and/or features configured to receive data segments (e.g., via receive feature 1012) via at least one of the communication channels coupled to network node 120. In some examples, the received data segments may separately include data segment headers in the format of data segment header format 400. For these examples, the data segment headers may have an identifier that indicates the data segments belong to a plurality of data segments associated with a large data packet destined for network node 120. The separate data segment headers may also include respective sequence information and a checksum.

Proceeding from block 1210 to block 1220 (Combine Payloads), reassembly manager 104 may include logic and/or features configured to obtain information from the separate headers for the received data segments and combine payloads from data segments associated with the large data packet (e.g., via combine feature 1014). In some examples, the payloads may be combined by reassembly manager 104 located at 170 device 230 (see receive path 700 in FIG. 7) or combined by reassembly manager 104 located at I/O device derive 213 (see receive path 800 in FIG. 8). For either example, the combined payloads may be placed in a memory having one or more memory addresses associated with or allocated for the large data packet.

Proceeding from block 1220 to decision block 1230 (Missing Segment(s)?), reassembly manager 104 may include logic and/or features configured to determine whether one or more data segments associated with the large data packet are missing (e.g., via sequence feature 1016). In some examples, reassembly manager 104 may keep track of the sequence information include in the data segment headers to determine whether any data segments in the sequence are missing. For example, reassembly manager 104 may create and maintain a table (e.g., in memory 1030) that, includes sequence information for the received data, segments. Reassembly manager 104 may also initiate a timer upon creation of the table. If all the sequence information is filled in the table before the timer expires, then reassembly manager 104 determines that all the data segments for the large data packet have been received and the process moves to block 1260. If the timer expires before the sequence information is filled or completed in the table, then reassembly manger 104 determines that data segments may be missing and the process moves to block 1240.

Moving from decision block 1230 to block 1240 (Forward NACK to Source), reassembly manager 104 may include logic and/or features configured to forward a NACK to the source of the data, segments (e.g., via indicate feature 1018). In some examples, the NACK may serve as a notification to network node 110 that one or more data segments associated with the large packet were missing.

Moving from decision block 1230 to decision block 1250 (Send Indication to OS Stack Elements), reassembly manager 104 may include logic and/or features to send or forward an indication to OS stack elements 213 that the large data packet has been received (e.g., via indicate feature 1018). In some examples, the indication may include the memory address having one or more memory addresses associated with or allocated for the large data packet.

Proceeding form either blocks 1240 or 1250 to decision block 1260 (Resent or Addt'l Data Segments?), reassembly manager 104 may include logic and/or features configured to determine whether resent data segments have been received for the large data packet or whether additional data segments associated with another large data packet has been received (e.g., via receive feature 1012). If resent or additional data segments have been received, the process moves to block 1220. Otherwise, the process comes to an end.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores"

may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some examples a first method may be implemented. The first method may include receiving a notification that a large data packet is ready to be forwarded from a network node to a destination. The large data packet may include an amount of data that is larger than a maximum transmission unit (MTU) associated with individual data, frames to be forwarded from the network node via a communication channel. For these examples, the large data packet may be segmented into a plurality of data segments. Each data, segment to include an amount of data no greater than the MTU. Separate headers may then be generated for each of the plurality of data segments. The separate headers may include an identifier to indicate an association with the large data packet, a sequence number to indicate a respective sequence of each data segment, and a checksum. The plurality data segments may then be forwarded with separate headers via the communication channel.

According to some examples, implementing the first method may include forwarding the data segments with separate headers in a protocol format associated with layer 2 protocols. Also the notification that the large packet is read to be forwarded may have been received from elements of an operating system for the network node. The elements may implement protocols associated with layer 3 and above protocols. The notification may indicate a memory address associated with memory arranged to at least temporarily maintain the large data packet.

In some examples, implementing the first method may also include segmenting the large data packet and generating separate headers for each of the data segments by segmenting and generating separate headers with a driver associated with a network I/O device for the network node. For these examples, the driver may be implemented as part of an operating system for the network node. The plurality of data segments with separate headers may be forwarded through the network I/O device. The network I/O device may be configured to couple the network node to the communication channel.

According to some examples, implementing the first method may also include segmenting the large data packet and generating separate headers for each of the plurality of data segments by segmenting and generating separate headers with logic maintained at a network I/O device for the network node. For these examples, the plurality of data segments with separate headers may be forwarded through the network I/O device that may be configured to couple the network node to the communication channel.

In some examples, implementing the first method may also include receiving an indication that one or more of the plurality of data segments with separate headers was not received or was received with errors at one of an intermediate network node or a destination network node. The one or more data segments with separate headers that were indicated as not received or received with errors may then be re-forwarded. For these examples, the intermediate network may include a switch through which the plurality of data segments may be routed to reach the destination network node.

In some examples, for implementing the first method, the amount of data included in the large data packet may equate to an amount greater than or equal to 64 kilobytes.

According to some examples, for implementing the first method, the separate headers may include an internet protocol (IP) header.

In some examples, implementing the first method may also include forwarding the plurality of data segments with separate headers via the communication channel that is arranged to operate in accordance an Ethernet standard and the MTU associated with individual data frames to be forwarded from the network node equates to 1.5 kilobytes of data.

According to some examples, at least one machine readable medium comprising a plurality of instructions that in response to being executed on a computing device cause the computing device to carry out the first method as mentioned above.

In some examples an apparatus or device may include means for performing the first method as mentioned above.

In some examples a second method may be implemented. The second method may include receiving a data segment at a network node via a communication channel. The data segment including a header having an identifier that indicates the data segment is one of a plurality of data segments associated with a large data packet destined for the network node. The header also including a checksum, and a sequence number to indicate a sequence of the data segment in relation to the plurality of data segments. Additional data segments may also be received at the network node, the additional data segments separately having headers that include the identifier, checksums, and sequence numbers to indicate a respective sequence of the additional data segments in relation to the plurality of data segments. A data payload may then be combined for the received data segment with data payloads for the received additional data segments. The combined data payloads may form at least a portion of the large data packet. The combined data payloads may have a data size larger than a maximum transmission unit (MTU) associated with individual data frames received via the communication channel.

According to some examples, implementing the second method may also include receiving the data segments via the communication channel in a protocol format associated with layer 2 protocols.

In some examples, implementing the second method may also include determining whether all the data segments associated with the large data packet have been received and indicating to elements of an operating system for the network node that the large data packet has been received. The indication may be based on a determination that ail the data segments associated with the large data packet have been received. The elements of the operating system may be arranged to implement protocols associated with layer 3 and above protocols. For these examples, the combine data payloads may then be stored in a memory for the network node. Also, the indication to the elements of the operation system may include one or more memory addresses associated with where the combined data payloads were stored in the memory.

According to some examples, implementing the second method may also include determining whether all the data segments associated with the large data packet have been received. An indication may be forwarded to the source of the large data packet based on a determination that one or more of the data segments associated with the large data packet have not been received.

In some examples, implementing the second method may also include combining the data payload for the received data segment with data payloads for the received additional data segments by combining the data payloads with a driver associated with a network I/O device for the network node. The driver may be implemented as part of an operating system for the network node. The received data segment and the additional data segments may be received through the network I/O device that is configured to couple the network node to the communication channel.

According to some examples, the second method may also include combining the data payload for the received data segment with data payloads for the received additional data segments by combining the data payloads with logic maintain at a network I/O device for the network node. The received data segment and the additional data segments may be received through the network I/O device that may be configured to couple the network node to the communication channel.

In some examples, implementing the second method may also include receiving the data segment at the network node via the communication channel that may be arranged to operate in accordance an Ethernet standard. The MTU associated with individual data frames received via the communication channel may equal or equate to 1.5 kilobytes of data.

According to some examples, at least one machine readable medium comprising a plurality of instructions that in response to being executed on a computing device cause the computing device to carry out the second method as mentioned above.

In some examples an apparatus or device may include means for performing the second method as mentioned above.

In some examples a third method may be implemented. The third method may include receiving a notification from elements of an operating system for a network node that a large data packet is ready to be forwarded from the network node to a destination. The large data packet may include an amount of data that is larger than a maximum transmission unit (MTU) associated with individual Ethernet data frames to be forwarded from the network node via an Ethernet communication channel. The notification may have been received from elements of an operating system at the network node that implement protocols associated with layer 3 and above protocols. The notification may indicate a memory address associated with memory arranged to at least temporarily maintain the large data packet. The large data packet may then be segmented into a plurality of data segments at a network input/output device for the network node. The network input/output device may be arranged to couple the network node to the Ethernet communication channel and each data segment may include an amount of data no greater than the MTU. Separate headers may then be generated for each of the plurality of data segments at the network input/output device. The separate headers may include an identifier to indicate an association with the large data, packet, a sequence number to indicate a respective sequence of each data segment, and a checksum. The checksum included in each of the plurality of data segments may enable separate data segments from among the plurality of data segments to be retransmitted without retransmitting ail of the plurality of data segments. The plurality data segments may be transmitted with separate headers via the Ethernet communication channel in individual Ethernet data frames.

According to some examples, implementing the third method may include receiving an indication that one or more of the plurality of data segments with separate headers was not received or was received with errors at one of an intermediate network node or a destination network node. The one or more data segments with separate headers that were indicated as not received or received with errors may then be retransmitted. The intermediate network node may include a switch through which the pluralities of data segments are routed to reach the destination network node.

According to some examples, implementing the third method may include the amount of data included in the large data packet comprising an amount greater than or equal to 64 kilobytes.

According to some examples, at least one machine readable medium comprising a plurality of instructions that in response to being executed on a computing device cause the computing device to carry out the third method as mentioned above.

In some examples an apparatus or device may include means for performing the third method as mentioned above.

According to some examples, an apparatus or device may include a processor circuit and a memory unit communicatively coupled to the processor circuit. The memory-unit may be arranged to store instructions for logic operative on the processor circuit. The logic may be configured to receive a data segment at a network node coupled to a communication channel. The data segment may include a header having an identifier that indicates the data segment is one of a plurality of data segments associated with a large data packet destined for the network node. The header may also include a checksum and a sequence number to indicate a sequence of the data segment in relation to the plurality of data segments. The logic may also be configured to receive additional data segments at the network node. The additional data segments may separately have headers that include the identifier, checksums, and sequence numbers to indicate a respective sequence of the additional data segments in relation to the plurality of data segments. The logic may also be configured to combine a data payload for the received data, segment with data payloads for the received additional data segments. The combined data payloads to form at least a portion of the large data packet and to have a data size larger than a maximum transmission unit (MTU) associated with individual data frames received over the communication channel.

In some examples, the memory unit included in the device may include volatile memory.

According to some examples, the logic operative on the processor circuit may be configured to receive the data segments at the network node coupled to the communication channel in a protocol format associated with layer 2 protocols.

In some examples, the logic operative on the processor circuit may also be configured to determine whether all the data segments associated with the large data packet have been received and indicate to elements of an operating system for the network node that the large data packet has been received based on a determination that all the data segments associated with the large data packet have been received. The elements of the operating system may be arranged to implement protocols associated with layer 3 and above protocols.

According to some examples, the processor circuit and the memory included in the device may be maintained at a network I/O device for the network node. The received data segment and the additional data segments received through the network TO device that is configured to couple the network node to the communication channel.

In some examples, the logic operative on the processor circuit may include a driver associated with a network I/O device for the network node. The driver implemented as part of an operating system for the network node. The received data, segment and the additional data segments received through the network I/O device that is configured to couple the network node to the communication channel.

According to some examples, the logic operative on the processor circuit may be configured to receive the data segment at the network node coupled to the communication channel by the communication channel being arranged to operate in accordance an Ethernet standard. For these examples, the MTU associated with individual data frames received over the communication channel may equal or equate to 1.5 kilobytes of data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving a data segment at a network input/output device that is configured to couple a network node to a communication channel, the data segment including a header having an identifier that indicates the data segment is one of a plurality of data segments associated with a large data packet destined for the network node, the header also including a checksum, and a sequence number to indicate a sequence of the data segment in relation to the plurality of data segments;
    receiving additional data segments at the network node, the additional data segments separately having headers that include the identifier, checksums, and sequence numbers to indicate a respective sequence of the additional data segments in relation to the plurality of data segments;

combining, with logic maintained at the network input/output device, a data payload for the received data segment with data payloads for the received additional data segments, the combined data payloads to form at least a portion of the large data packet, the combined data payloads to have a data size larger than a maximum transmission unit (MTU) associated with individual data frames received via the communication channel;

storing the combined data payloads in a memory for the network node; and indicating to elements of an operating system one or more memory addresses associated with where the combined data payloads were stored in the memory.

2. The method of claim 1, comprising receiving the data segments via the communication channel in a protocol format associated with layer 2 protocols.

3. The method of claim 2, comprising:
determining whether all the data segments associated with the large data packet have been received; and
indicating to elements of the operating system for the network node that the large data packet has been received based on a determination that all the data segments associated with the large data packet have been received, the elements of the operating system arranged to implement protocols associated with layer 3 and above protocols.

4. The method of claim 1, comprising:
determining whether all the data segments associated with the large data packet have been received; and
forwarding an indication to a source of the large data packet based on a determination that one or more of the data segments associated with the large data packet have not been received.

5. The method of claim 1, comprising:
receiving the data segment at the network node via the communication channel that is arranged to operate in accordance an Ethernet standard and the MTU associated with individual data frames received via the communication channel equates to 1.5 kilobytes of data.

6. An apparatus comprising:
a processor circuit maintained at a network input/output device configured to couple a network node to a communication channel; and
a memory unit communicatively coupled to the processor circuit, the memory unit arranged to store instructions for logic operative on the processor circuit, the logic configured to:
receive a data segment at the network input/output device, the data segment including a header having an identifier that indicates the data segment is one of a plurality of data segments associated with a large data packet destined for the network node, the header also including a checksum, and a sequence number to indicate a sequence of the data segment in relation to the plurality of data segments,
receive additional data segments at the network input/output device, the additional data segments separately having headers that include the identifier, checksums, and sequence numbers to indicate a respective sequence of the additional data segments in relation to the plurality of data segments,
combine a data payload for the received data segment with data payloads for the received additional data segments, the combined data payloads to form at least a portion of the large data packet, the combined data payloads to have a data size larger than a maximum transmission unit (MTU) associated with individual data frames received over the communication channel,
store the combined data payloads in a memory for the network node; and
indicate to elements of an operating system one or more memory addresses associated with where the combined data payloads were stored in the memory.

7. The apparatus of claim 6, comprising the memory unit to include volatile memory.

8. The apparatus of claim 7, the logic configured to receive the data segments at the network node coupled to the communication channel in a protocol format associated with layer 2 protocols.

9. The apparatus of claim 7, comprising the logic configured to:
determine whether all the data segments associated with the large data packet have been received; and
indicate to elements of the operating system for the network node that the large data packet has been received based on a determination that all the data segments associated with the large data packet have been received, the elements of the operating system arranged to implement protocols associated with layer 3 and above protocols.

10. The apparatus of claim 6, the logic configured to receive the data segment at the network node coupled to the communication channel comprises the communication channel arranged to operate in accordance an Ethernet standard and the MTU associated with individual data frames received over the communication channel equates to 1.5 kilobytes of data.

11. At least one non-transitory machine readable medium comprising a plurality of instructions that in response to being executed by a network input/output device configured to couple a network node to a communication channel, cause the network input/output device to:
receive a data segment at the network input/output device, the data segment including a header having an identifier that indicates the data segment is one of a plurality of data segments associated with a large data packet destined for the network node, the header also including a checksum, and a sequence number to indicate a sequence of the data segment in relation to the plurality of data segments;
receive additional data segments at the network input/output device, the additional data segments separately having headers that include the identifier, checksums, and sequence numbers to indicate a respective sequence of the additional data segments in relation to the plurality of data segments;
combine a data payload for the received data segment with data payloads for the received additional data segments, the combined data payloads to form at least a portion of the large data packet, the combined data payloads to have a data size larger than a maximum transmission unit (MTU) associated with individual data frames received over the communication channel;
store the combined data payloads in a memory for the network node; and
indicate to elements of an operating system one or more memory addresses associated with where the combined data payloads were stored in the memory.

12. The at least one non-transitory machine readable medium of claim 11, comprising a plurality of instructions that in response to being executed by the network input/output device cause the network input/output device to receive the data segments at the network node coupled to the communication channel in a protocol format associated with layer 2 protocols.

13. The at least one non-transitory machine readable medium of claim 11, comprising a plurality of instructions that in response to being executed by the network input/output device cause the network input/output device to:
   determine whether all the data segments associated with the large data packet have been received; and
   indicate to elements of the operating system for the network node that the large data packet has been received based on a determination that all the data segments associated with the large data packet have been received, the elements of the operating system arranged to implement protocols associated with layer 3 and above protocols.

14. The at least one non-transitory machine readable medium of claim 11, comprising a plurality of instructions that in response to being executed by the network input/output device cause the network input/output device to receive the data segment at the network node coupled to the communication channel comprises the communication channel arranged to operate in accordance an Ethernet standard and the MTU associated with individual data frames received over the communication channel equates to 1.5 kilobytes of data.

\* \* \* \* \*